United States Patent
Zolfonoon

(10) Patent No.: US 10,148,619 B1
(45) Date of Patent: Dec. 4, 2018

(54) IDENTITY-BASED APPLICATION-LEVEL FILTERING OF NETWORK TRAFFIC

(71) Applicant: EMC IP Holding Company LLC, Hopkinton, MA (US)

(72) Inventor: Riaz Zolfonoon, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/191,796

(22) Filed: Jun. 24, 2016

(51) Int. Cl.
*H04L 29/06* (2006.01)
*H04L 29/08* (2006.01)
*H04L 12/26* (2006.01)

(52) U.S. Cl.
CPC .......... *H04L 63/0245* (2013.01); *H04L 43/12* (2013.01); *H04L 63/1425* (2013.01); *H04L 65/1066* (2013.01); *H04L 67/142* (2013.01); *H04L 69/329* (2013.01)

(58) Field of Classification Search
CPC ............ H04L 63/0245; H04L 63/0227; H04L 63/0236; H04L 63/1425; H04L 65/1066; H04L 43/12; H04L 67/142; H04L 69/329
See application file for complete search history.

(56) References Cited

U.S. PATENT DOCUMENTS

| | | | |
|---|---|---|---|
| 7,215,748 B2 | 5/2007 | Ngo et al. | |
| 7,299,277 B1 | 11/2007 | Moran et al. | |
| 8,174,983 B2 | 5/2012 | Khan et al. | |
| 8,504,681 B1 | 8/2013 | Cooper et al. | |
| 8,839,402 B1 | 9/2014 | Hughes et al. | |
| 8,855,312 B1* | 10/2014 | Hodgman | G06F 21/44 380/270 |
| 8,925,053 B1* | 12/2014 | Mehta | G06F 21/31 713/155 |
| 8,977,746 B2 | 3/2015 | Hughes et al. | |
| 9,276,819 B2 | 3/2016 | Maon et al. | |
| 2013/0305363 A1 | 11/2013 | Cooper et al. | |
| 2014/0019609 A1 | 1/2014 | Williams et al. | |
| 2014/0095711 A1 | 4/2014 | Kim et al. | |
| 2014/0189104 A1 | 7/2014 | Dalton et al. | |

* cited by examiner

*Primary Examiner* — Ayoub Alata
(74) *Attorney, Agent, or Firm* — Ryan, Mason & Lewis, LLP

(57) ABSTRACT

A processing device in one embodiment comprises a processor coupled to a memory and is configured to derive one or more items of context information arising from a given application session within a network, and determine a level of sensitivity to be attributed to the given application session by analyzing one or more factors against the one or more items of context information. The processing device is further configured to generate a filtering score for the given application session based on the determined level of sensitivity, wherein the filtering score indicates a level of relevance attributed to the given application session with respect to a task of monitoring traffic within the network, and output the filtering score to one or more components associated with the network.

19 Claims, 2 Drawing Sheets

IDENTITY-BASED APPLICATION-LEVEL FILTERING OF NETWORK TRAFFIC

FIELD

The field relates generally to computer networks, and more particularly to techniques for providing security in a computer network.

BACKGROUND

Traditional monitoring approaches can include using a switched port analyzer (SPAN), mirror ports, or terminal access points (TAPs). Such approaches, however, can overwhelm the related monitoring tools. Additionally, separate network tools can attempt to capture application-specific traffic. However, in such scenarios, the application identification and filtering logic commonly depends exclusively on network and transport layer parameters such as source and destination internet protocol (IP) addresses, source and destination ports, protocol and virtual local area network (VLAN) tags.

SUMMARY

Illustrative embodiments of the invention provide techniques for identity-based application-level filtering of network traffic. An exemplary computer-implemented method can include deriving one or more items of context information arising from a given application session within a network, and determining a level of sensitivity to be attributed to the given application session by analyzing one or more factors against the one or more items of context information. Such a method can additionally include generating a filtering score for the given application session based on the determined level of sensitivity, wherein the filtering score indicates a level of relevance attributed to the given application session with respect to a task of monitoring traffic within the network, and outputting the filtering score to one or more components associated with the network.

Another embodiment of the invention or elements thereof can be implemented in the form of a processor-readable storage medium having stored therein program code of one or more software programs, wherein the program code when executed by at least one processing device causes said at least one processing device to carry out a plurality of method steps, as described herein. Furthermore, another embodiment of the invention or elements thereof can be implemented in the form of an apparatus including a memory and at least one processing device comprising a processor coupled to the memory and configured to perform noted method steps.

These and other illustrative embodiments include, without limitation, methods, apparatus, networks, systems and processor-readable storage media.

DETAILED DESCRIPTION

As detailed herein, in one or more embodiments of the invention, intelligence gained from a source such as, for example, an Identity and Access Management (IAM) infrastructure in an enterprise can be used to enrich the application isolation logic in a network tool to filter and process only the session traffic that is deemed most relevant. In an example IAM platform, user authentication and coarse-level application authorization policies are externalized and handled by a component referred to as an Identity Provider (IDP). Additionally, as detailed herein, IDPs can consider and leverage user behavior and environmental factors to adaptively enforce the most appropriate and secure method(s) of authentication. Once a user is authenticated, the sensitivity of the applications and the strength of the authenticated sessions can be used to authorize the appropriate level of access. Accordingly, a significant level of intelligence pertaining to the security of application sessions is available at IDPs.

At least one embodiment of the invention includes enhancing the filtering capabilities of network security tools using the identity context information available derived from IDPs and/or from identity products such as, for example, RSA® Via Access, a product from EMC Corporation of Hopkinton, Mass. Based on intelligence gained from the identity context information, one or more embodiments of the invention can include dynamically adjusting the amount of application-level traffic to be filtered by a network security tool (such as a monitoring and visibility tool). Such adjusting enables the network security tool to function more efficiently and avoid wasting compute resources and bandwidth on irrelevant data. Further, the integration between network monitoring and identity infrastructure significantly improves the overall security of a network environment by enabling static monitoring tools to be enhanced with additional identity intelligence that is most relevant to each application invocation.

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
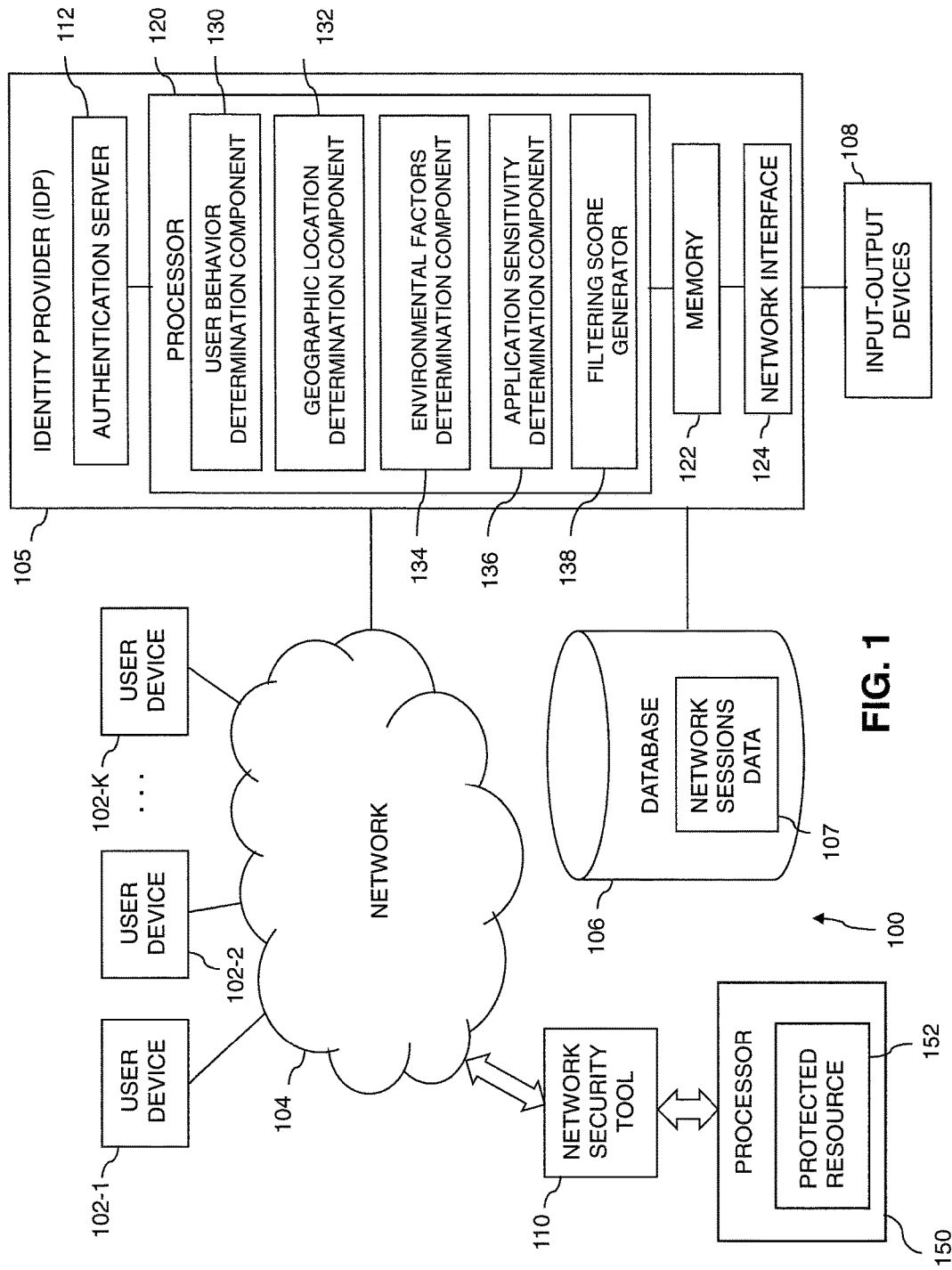
FIG. 1 is a block diagram of a computer network configured for identity-based application-level filtering of network traffic in an illustrative embodiment of the invention.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is an IDP 105, which is further described herein.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks each comprising processing devices configured to communicate using IP or other related communication protocols.

The IDP 105 has an associated database 106 configured to store data characterizing multiple network sessions for each of a plurality of distinct user identifiers. It should be noted that the term "network sessions data" as used herein is intended to be broadly construed, and may comprise, for example, authentication data or other types of login data including timestamps and other information associated with login events.

The database 106 in the present embodiment is implemented using one or more storage systems associated with the IDP 105. Such storage systems can comprise any of a variety of different types of storage including network-attached storage (NAS), storage area networks (SANs), direct-attached storage (DAS) and distributed DAS, as well as combinations of these and other storage types, including software-defined storage. In one or more embodiments of the invention, the IDP 105 can also include a user directory, which can include a database with a storage system, and/or a system such as, for example, Lightweight Directory Access Protocol (LDAP). In such an embodiment, a directory can be used, for example, to store user profiles, whereas a database may be used, for example, to store other relevant data, configuration information, policies, etc.

Examples of particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given storage system in an illustrative embodiment.

The network sessions data 107 illustratively comprise respective timestamps and other information characterizing successful logins processed in conjunction with users attempting to access protected resources (such as applications, for example) of the computer network 100 via the user devices 102. Other types of login events or more generally network session events may be used in other embodiments.

Referring specifically to the example embodiment of the invention depicted in FIG. 1, a protected resource 152 can include, for example, an application that executes on an instance of processor 150. As illustrated, processor 150 is connected to network 104 through a network security tool 110, wherein the network security tool 110 can include, for example, a device that is positioned in front of processor 150 and intercepts traffic going to protected resource 152 on processor 150. In such an embodiment, a user (via user device 102) is initially attempting to connect to the protected resource 152, but is subsequently redirected to the IDP 105 (and can eventually be returned to the protected resource 152). Upon return to the protected resource 152, a session (such as noted above) is established. At such a time, the network security tool (which is in front of the protected resource 152) intercepts the traffic and performs a monitoring task using a filtering level and/or score determined by IDP 105 (as further detailed herein).

Also associated with the IDP 105 are input-output devices 108, which illustratively comprise keyboards, displays or other types of input-output devices in any combination. Such input-output devices are used to support one or more user interfaces to the IDP 105, as well as to support communication between the IDP 105 and other related systems and devices not explicitly shown. Note, however, that in accordance with one or more embodiments of the invention, the traffic into and out of the IDP 105 (for such a use case) are occurring through a network connection 124 of the IDP 105.

In one or more embodiments of the invention, outputs generated by the IDP 105 can be provided over the network 104 to one or more network security tools 110. Such devices can illustratively comprise one or more types of processing devices configured for communication over network 104 with the IDP 105. As noted above, in one or more embodiments of the invention (such as in the example embodiment depicted in FIG. 1, the network tool 110 is a device positioned in front of processor 150 that hosts the protected resource (target application) 152.

It should be noted that a "network security tool" (or simply "network tool") as the term is generally used herein may comprise, for example, an automated entity, such as a hardware, software or firmware entity running on a processing device. Accordingly, like the above-noted "user," a network security tool may but need not comprise a human entity. Additionally, the IDP 105 comprises an authentication server 112. Login events initiated at respective ones of the user devices 102 are directed to the authentication server 112 over the network 104 for processing. The authentication server 112 determines if a given access attempt is authentic based on presentation of one or more predetermined authentication factors such as user identifiers, passwords or other factors. Upon verification of the presented authentication factors, the authentication server 112 grants the requesting user device 102 access to one or more protected resources of the computer network 100. Although shown as an element of the IDP 105 in this embodiment, the authentication server 112 in other embodiments can be implemented at least in part externally to the IDP 105, for example, as a stand-alone server, set of servers or other type of authentication system coupled to the network 104.

In the FIG. 1 embodiment, a successful access attempt is assumed to represent a login event for the corresponding user identifier and is logged in the database 106 as part of the network sessions data 107. Other types of authentication mechanisms and associated login events or other network sessions data can be used in other embodiments. For example, network sessions data in some embodiments can illustratively include additional data characterizing one or more other aspects of a given network session.

It is assumed, in at least one embodiment of the invention, that the current network session is processed in real time by the IDP 105, responsive to initiation of the current network session within the computer network 100. The IDP 105 can be configured, for example, to support a real-time processing mode of operation.

The IDP 105 in the FIG. 1 embodiment is assumed to be implemented using at least one processing device. Each such processing device generally comprises at least one processor and an associated memory, and implements one or more functional modules for controlling certain features of the IDP 105. More particularly, the IDP 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the IDP 105 to communicate over the network 104 with the user devices 102 and the network security tool 110, and illustratively comprises one or more conventional transceivers.

The processor 120 further comprises a user behavior determination component 130, a geographic location (geo-location) determination component 132, an environmental factors determination component 134, an application sensitivity determination component 136, and a filtering score generator 138. In one or more embodiments of the invention, environmental factors that might be considered by component 134 can include, for example, the type and version of software (such as a browser) that the user device 102 is using to access the protected resource 152, the time of day during which the user device 102 is attempting to access the protected resource 152, the particular version of the operating system which is running on the user device 102, whether or not the user device 102 is using a secure transport layer security (TLS) session, whether or not a particular user device 102 attempted to login to the same protected resource 152 recently from a different location (for example, if the IDP 105 detects that the user device 102 logged-in at time 5:05 from a location in United States and again at time 5:30 from a location in China), etc.

Accordingly, and as further detailed herein, at least one embodiment of the invention can include offloading application identification and filtering policies to the IDP 105, wherein user authentication and application access control policies are maintained and evaluated. In one or more embodiments of the invention, the IDP 105 can determine the sensitivity of a given application session by analyzing dynamic factors via the user behavior determination component 130 (analyzing the risk associated with the user profile and behavior), the geographic location determination component 132 (analyzing the risk associated with the geo-location of the original client), the environmental factors determination component 134 (analyzing the risk associated with the strength of the user authentication), and the application sensitivity determination component 136. Based on the analysis of such dynamic factors by one or more of components 130, 132, 134, and 136, the processor 120 can generate and output a filtering score via the filtering score generator 138.

In one or more embodiments of the invention, the filtering score can be based on a risk score resulting from an authentication. Additionally, by way merely of example, component 130 can determine actions of users such as users attempting to access a resource that such users generally do not attempt to access (therefore deeming such a session as high(er) risk). Also, component 132 can, for example, analyze a scenario wherein a given user is initiating resource access from country X, and per pre-determined policies and/or rules, any access to this resource from countries X, Y or Z are suspect or high risk unless conditions a, b, or c are valid (for instances, a certain event is in progress between these countries, etc.). In another example, component 132 can analyze a scenario wherein a particular user has never previously accessed a given resource over a virtual private network (VPN) from outside of the enterprise network. Therefore, a session (attempting to access the given resource) being conducted by the particular user outside of the enterprise network via a VPN can be deemed a higher risk than when the user attempts to access the given resource from within the enterprise network.

Using industry standards (such as, for example, identity and access standards), at least one embodiment of the invention provides a mechanism for the IDP 105 to generate and output a filtering score, derived from the determined sensitivity of the application session, to the network security tool 110. Such standards, as noted above, can include standards relevant to IDP such as, for example, security assertion markup language (SAML), which generates a singed assertion (ticket) and which proves a successful authentication at an IDP. The generated assertion can also carry attributes about the subject of the authentication such as, for example, profile information, filtering score, etc. Other relevant standards can include, for example, OpenID® Connect, and OAuth.

Referring again to FIG. 1, the network security tool 110 can dynamically invoke the relevant filter(s) to the task of monitoring traffic through one or more connections of the network 104, based on the filtering score provided by the IDP 105. Such filters, as noted above and herein, can include a variety of types. For example, one or more filters can be directed to the type of messages and/or packets being captured (or not being captured). For instance, if a given session is low risk, such a filter can be implemented to only capture connection establishment messages to obtain general information pertaining to which user(s) connected to which application(s) under what conditions. Alternatively, if a given session is deemed to be of a medium amount of risk (as indicated by filtering score), then such a filter can be implemented to capture basic information pertaining to all packets for the entire session (from connect to disconnect).

Additionally, one or more filters can be directed to the level of detail from each packet captured and stored (that is, more details are captured and stored (which uses more storage and compute) only if the session was determined to be risky). For high risk session, for instance, such a filter can be implemented to capture the entire traffic for a session so that the entire session can be replayed.

It is to be appreciated that this particular arrangement of components 130, 132, 134, 136, and 138 illustrated in the processor 120 of the FIG. 1 embodiment is presented by way of example only, and alternative arrangements can be used in other embodiments. For example, the functionality associated with the components 130, 132, 134, 136, and 138 in other embodiments can be combined into a single module, or separated across a larger number of modules. As another example, multiple distinct processors can be used to implement different ones of the components 130, 132, 134, 136, and 138 or portions thereof.

At least portions of the user behavior determination component 130, the geographic location determination component 132, the environmental factors determination component 134, the application sensitivity determination component 136, and the filtering score generator 138 may be implemented at least in part in the form of software that is stored in memory 122 and executed by processor 120. Similarly, at least portions of the authentication server 112 of the IDP 105 can be implemented at least in part in the form of software that is stored in memory 122 and executed by processor 120.

It is to be understood that the particular set of elements shown in FIG. 1 for implementing identity-based application-level filtering of network traffic involving user devices 102 of computer network 100 and for automatically implementing remedial measures based on the detected session-based access anomalies is presented by way of illustrative example only, and in other embodiments additional or alternative elements may be used. Thus, another embodiment may include additional or alternative systems, devices and other network entities, as well as different arrangements of modules and other components.

By way of example, in other embodiments, the IDP 105 can be eliminated and associated elements such as authentication server 112, user behavior determination component 130, geographic location determination component 132, environmental factors determination component 134, application sensitivity determination component 136, and filtering score generator 138 can be implemented elsewhere in the computer network 100. An exemplary process utilizing user behavior determination component 130, geographic location determination component 132, environmental factors determination component 134, application sensitivity determination component 136, and filtering score generator 138 of the IDP 105 in computer network 100 will be described in more detail below with reference to the flow diagram of FIG. 2.

As detailed herein, an IDP can leverage context information derived from network traffic and dynamically adjust the level of filtering to be enforced by the network security tool 110 for each application session. Such actions can be carried out in multiple ways. For example, as detailed above, the IDP 105 can derive a filtering score based on various risk factors of a network session (as described above) and output the filtering score to the network tool 110 as a signed assertion through an application programming interface (API) call. Standard identity format and protocols such as, for example, SAML, can be used to generate and consume the assertion. As part of the initial configuration, the network tool 110 can be configured to take the appropriate action upon receiving the filtering score. For example, access to a video streaming application may receive a low filtering score (indicating a low level of relevance for the tool 110), and thus, can be ignored by the network tool 110 and/or precluded from monitoring, whereas access to a business application by a user from outside the enterprise may be identified as high risk with a high filtering score (indicating a high level of relevance for the tool 110), and correspondingly highlighted for monitoring by the network tool 110. Depending on the risk level, different scores can be generated, resulting in varying amount of data being captured and/or monitored.

By way of additional example, a filtering score can be passed from the IDP 105 to the target application as an attribute within an existing signed assertion (such as, for example, an SAML authentication assertion already exchanged between the IDP and the application, using the SAML federation protocol). The assertion can be intercepted by the network tool 110, or can be first processed by the relying party and passed to the tool 110, to be utilized for invoking the proper filter(s).

Further, in one or more IAM environments, wherein an IDP does not exist and other components such as Web Access Management (WAM) agents protect the applications, at least one embodiment of the invention can be implemented, for example, once the WAM agent receives the result of the access policy evaluation from the WAM server. The filtering score can be passed to the network tool 110 either by the WAM server or the WAM agent.

Figure 2:
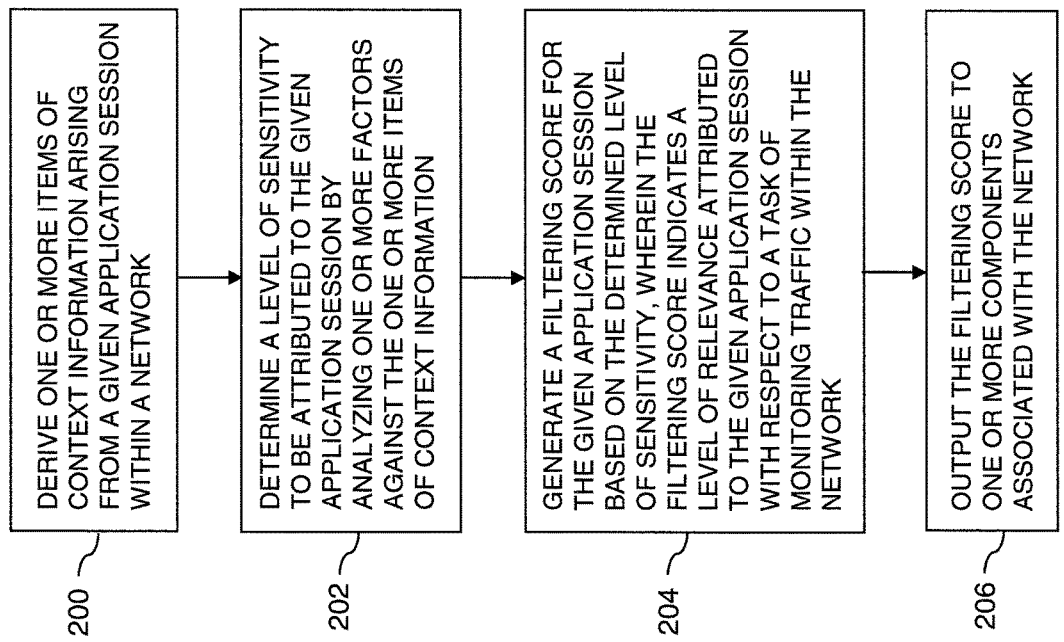
FIG. 2 is a flow diagram of a process for identity-based application-level filtering of network traffic in an illustrative embodiment.

FIG. 2 is a flow diagram of a process for identity-based application-level filtering of network traffic in an illustrative embodiment. It is to be understood that this particular process is only an example, and additional or alternative processes can be carried out in other embodiments.

In this embodiment, the process includes steps 200 through 206. These steps are assumed to be performed by the processor 120 utilizing components 130, 132, 134, 136 and/or 138.

In step 200, one or more items of context information arising from a given application session within a network are derived.

In step 202, a level of sensitivity to be attributed to the given application session is determined by analyzing one or more factors against the one or more items of context information. The one or more factors can include, for example, a risk associated with the user of the given application session, wherein the risk associated with the user can be based on a user profile attributed to the user and/or behavior of the user during the given application session. Additionally, wherein the one or more factors can include a risk associated with the geographic location of an original client of the given application session, a risk associated with one or more environmental factors, a risk associated with the strength of a user authentication associated with the given application session, and/or a level of sensitivity attributed to the application accessed in the given application session.

In step 204, a filtering score for the given application session is generated based on the determined level of sensitivity, wherein the filtering score indicates a level of relevance attributed to the given application session with respect to a task of monitoring traffic within the network.

In step 206, the filtering score is output to one or more components associated with the network. Outputting the filtering score to one or more components associated with the network can include outputting the filtering score to a network security tool, wherein the network security tool is configured to take a pre-determined action in response to receiving the filtering score. Also, the pre-determined action can include applying one or more filters to preclude monitoring data and/or capturing data arising from the given application session. Further, outputting the filtering score to the network security tool can include outputting the filtering score to the network security tool as a signed assertion through an application programming interface call.

Additionally, in one or more embodiments of the invention, outputting the filtering score to one or more components associated with the network can include outputting the filtering score to the application accessed in the given application session. In such an embodiment, outputting the filtering score to the application can include outputting the filtering score to the application as an attribute within an existing signed assertion.

As also detailed herein, in one or more embodiments of the invention, steps 200, 202, 204 and 206 can be performed by at least one processing device comprising a processor coupled to a memory. By way of example, in at least one embodiment of the invention, the at least one processing device can include an IDP connected to the network.

Additional instances of steps 200 through 206 can be performed responsive to occurrence of additional network sessions for respective user identifiers or may otherwise be repeated periodically in order to ensure efficient monitoring and/or security actions being carried out within the computer network 100.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches. For example, some embodiments are configured to provide improved utilization of security monitoring tools for application inspection. Using the identity context information associated with access to an application, such embodiments can include dynamically filtering-out non-critical applications and forwarding only traffic corresponding to high-risk, sensitive, and/or mission critical applications to the security monitoring tools. This enables the security tools to function more efficiently as well as waste less bandwidth and compute resources on potentially irrelevant data.

These and other embodiments can also effectively offload filtering policies to IDPs, wherein identify applications based on identity context are available at IDPs.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker™ containers or other types of Linux® containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a Wi-Fi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRack™ or Vblock® converged infrastructure commercially available from VCE™, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security tools, modules, IDPs, filtering scores, and other components and parameters can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method for application-level filtering of network traffic, the method comprising steps of:
   deriving one or more items of context information arising from a given application session within a network;
   determining a level of sensitivity to be attributed to the given application session by analyzing one or more factors against the one or more items of context information, wherein the one or more factors comprise at least a risk associated with strength of a user authentication associated with the given application session;
   generating a filtering score for the given application session based on the determined level of sensitivity, wherein the filtering score indicates a level of relevance attributed to the given application session with respect to a task of monitoring traffic within the network; and
   outputting the filtering score, for use in capturing application-related traffic, to one or more components associated with the network, wherein the one or more components comprise a network security tool, and wherein said outputting comprises outputting the filtering score to the network security tool as a signed assertion through an application programming interface call;
   wherein the steps are performed by at least one processing device comprising a processor coupled to a memory.

2. The method of claim 1, wherein the one or more factors comprise a risk associated with the user of the given application session.

3. The method of claim 2, wherein the risk associated with the user is based on the user profile attributed to the user.

4. The method of claim 2, wherein the risk associated with the user is based on behavior of the user during the given application session.

5. The method of claim 1, wherein the one or more factors comprise a risk associated with a geographic location of an original client of the given application session.

6. The method of claim 1, wherein the one or more factors comprise a risk associated with one or more environmental factors.

7. The method of claim 1, wherein the one or more factors comprise a level of sensitivity attributed to the application accessed in the given application session.

8. The method of claim 1, wherein the network security tool is configured to take a pre-determined action in response to receiving the filtering score.

9. The method of claim 8, wherein the pre-determined action comprises applying one or more filters to preclude monitoring data and/or capturing data arising from the given application session.

10. The method of claim 1, wherein said outputting the filtering score to one or more components associated with the network comprises outputting the filtering score to the application accessed in the given application session.

11. The method of claim 10, wherein said outputting the filtering score to the application comprises outputting the filtering score to the application as an attribute within an existing signed assertion.

12. The method of claim 1, wherein the at least one processing device comprises an identity provider (IDP) connected to the network.

13. A non-transitory processor-readable storage medium having stored therein program code of one or more software programs, wherein the program code when executed by at least one processing device causes said at least one processing device to:
   derive one or more items of context information arising from a given application session within a network;
   determine a level of sensitivity to be attributed to the given application session by analyzing one or more factors against the one or more items of context information, wherein the one or more factors comprise at least a risk associated with strength of a user authentication associated with the given application session;
   generate a filtering score for the given application session based on the determined level of sensitivity, wherein the filtering score indicates a level of relevance attributed to the given application session with respect to a task of monitoring traffic within the network; and
   output the filtering score, for use in capturing application-related traffic, to one or more components associated with the network, wherein the one or more components comprise a network security tool, and wherein said outputting comprises outputting the filtering score to the network security tool as a signed assertion through an application programming interface call.

14. The processor-readable storage medium of claim 13, wherein the one or more factors comprise a risk associated with the user of the given application session.

15. The processor-readable storage medium of claim 13, wherein the one or more factors comprise a risk associated with a geographic location of an original client of the given application session.

16. An apparatus comprising:
   at least one processing device comprising a processor coupled to a memory;
   said at least one processing device being configured to:
      derive one or more items of context information arising from a given application session within a network;
      determine a level of sensitivity to be attributed to the given application session by analyzing one or more factors against the one or more items of context information, wherein the one or more factors comprise at least a risk associated with strength of a user authentication associated with the given application session;
      generate a filtering score for the given application session based on the determined level of sensitivity, wherein the filtering score indicates a level of relevance attributed to the given application session with respect to a task of monitoring traffic within the network; and
      output the filtering score, for use in capturing application-related traffic, to one or more components associated with the network, wherein the one or more components comprise a software network security tool, and wherein said outputting comprises outputting the filtering score to the software network security tool as a signed assertion through an application programming interface call.

17. The apparatus of claim 16, wherein the one or more factors comprise at least one of a risk associated with the user of the given application session, and a risk associated with a geographic location of an original client of the given application session.

18. The method of claim 6, wherein the one or more environmental factors comprises at least one of a type and a version of software used by the user during the given application session, a time of day during the given application session, and a version of an operating system which is running in connection with the given application session.

19. The method of claim 6, wherein the one or more environmental factors comprises a determination of whether a secure transport layer security session is used during the given application session.

\* \* \* \* \*